United States Patent
Lee et al.

(10) Patent No.: US 11,360,706 B2
(45) Date of Patent: Jun. 14, 2022

(54) MEMORY SYSTEM WITH PROGRAM MODE SWITCHING BASED ON MIXED AND SEQUENTIAL WORKLOADS

(71) Applicant: SK hynix Inc., Gyeonggi-do (KR)

(72) Inventors: Joo-Young Lee, Seoul (KR); Hoe-Seung Jung, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 48 days.

(21) Appl. No.: 16/802,833

(22) Filed: Feb. 27, 2020

(65) Prior Publication Data

US 2021/0042233 A1    Feb. 11, 2021

(30) Foreign Application Priority Data

Aug. 7, 2019    (KR) .................. 10-2019-0096255

(51) Int. Cl.
*G06F 3/06*    (2006.01)
*G06F 12/0875*    (2016.01)

(52) U.S. Cl.
CPC .......... *G06F 3/0659* (2013.01); *G06F 3/0611* (2013.01); *G06F 3/0634* (2013.01); *G06F 3/0679* (2013.01); *G06F 12/0875* (2013.01); *G06F 2212/452* (2013.01); *G06F 2212/6012* (2013.01)

(58) Field of Classification Search
CPC .... G06F 3/0659; G06F 3/0679; G06F 3/0611; G06F 12/0875; G06F 12/0246; G06F 12/0806; G06F 3/061; G06F 3/0634; G06F 2212/452; G06F 2212/6012; G06F 2212/7203; G06F 2212/0106; Y02D 10/00; G11C 2207/2245
See application file for complete search history.

(56) References Cited

U.S. PATENT DOCUMENTS

| | | | | |
|---|---|---|---|---|
| 2010/0080060 | A1* | 4/2010 | Chen | G11C 16/10 365/185.12 |
| 2011/0055457 | A1* | 3/2011 | Yeh | G06F 3/0679 711/103 |
| 2019/0266357 | A1* | 8/2019 | Schauer | G06F 13/4282 |
| 2020/0334163 | A1* | 10/2020 | Shergill | G06F 12/0868 |

FOREIGN PATENT DOCUMENTS

| | | |
|---|---|---|
| KR | 10-2004-0022646 | 3/2004 |
| KR | 10-1579555 | 12/2015 |

* cited by examiner

*Primary Examiner* — Reginald G Bragdon
*Assistant Examiner* — Curtis James Kortman
(74) *Attorney, Agent, or Firm* — IP & T Group LLP

(57) ABSTRACT

A memory system includes: a memory device; a host interface suitable for receiving write commands and queueing the received write commands in an interface queue; a workload manager suitable for detecting, in a cache program mode, a mixed workload when a read count is greater than a first threshold value, the read count representing a number of read commands queued in the interface queue and the mixed workload representing receipt of a mix of read and write commands; a mode manager suitable for switching from the cache program mode to a normal program mode when the mixed workload is detected; and a processor suitable for processing write commands queued in a command queue in the cache program mode and processing write commands queued in the interface queue in the normal program mode when the mixed workload is detected.

20 Claims, 14 Drawing Sheets

__US 11,360,706 B2__

MEMORY SYSTEM WITH PROGRAM MODE SWITCHING BASED ON MIXED AND SEQUENTIAL WORKLOADS

CROSS-REFERENCE TO RELATED APPLICATION

The present application claims priority of Korean Patent Application No. 10-2019-0096255, filed on Aug. 7, 2019, which is incorporated herein by reference in its entirety.

BACKGROUND

1. Field

Various embodiments of the present invention relate to a memory system, and more particularly, to a memory system capable of managing maximum read latency, and a method for operating the memory system.

2. Description of the Related Art

Recently, the paradigm for a computer environment is shifting to ubiquitous computing, which allows users to access computer systems anywhere anytime. The paradigm shift is rapidly increasing the use of portable electronic devices, such as mobile phones, digital cameras, and laptop computers. Such portable electronic devices may employ a memory system which generally uses a memory device, in other words, a data storage device. The data storage device may be used as a main memory device or an auxiliary memory device of a portable electronic device.

The data storage device using a memory device is advantageous in that it has excellent stability and durability with a fast data access rate and low power consumption because there is no mechanical driving part. As an example of the memory system having such advantages, the data storage device may include a USB (Universal Serial Bus) memory device, a memory card with various interfaces, a solid state drive (SSD), and the like.

SUMMARY

Embodiments of the present invention are directed to a memory system that may operate in a cache program mode or a normal program mode based on workload.

In accordance with an embodiment of the present invention, a memory system includes: a memory device; a host interface suitable for receiving write commands and queueing the received write commands in an interface queue; a workload manager suitable for detecting, in a cache program mode, a mixed workload when a read count is greater than a first threshold value, the read count representing a number of read commands queued in the interface queue and the mixed workload representing receipt of a mix of read and write commands; a mode manager suitable for switching from the cache program mode to a normal program mode when the mixed workload is detected; and a processor suitable for processing write commands queued in a command queue in the cache program mode and processing write commands queued in the interface queue in the normal program mode when the mixed workload is detected.

In accordance with another embodiment of the present invention, a method for operating a memory system includes: receiving write commands and enqueuing the received write commands in an interface queue; detecting a mixed workload when a read count is greater than a first threshold value in a cache program mode, the read count representing a number of read commands queued in the interface queue and the mixed workload representing receipt of a mix of read and write commands; switching from the cache program mode to a normal program mode when the mixed workload is detected; and processing write commands queued in a command queue in the cache program mode and processing write commands queued in the interface memory in the normal program mode when the mixed workload is detected.

In accordance with an embodiment of the present invention, a controller for controlling a memory device includes: first and second interface queues configured to enqueue program commands and read commands, respectively; a memory queue configured to enqueue commands dequeued from the first and second interface queues; and a processor configured to dequeue, when a number of the read commands enqueued in the second interface queue becomes greater than a threshold, the commands from the memory queue in a cache program mode, and to dequeue the commands from the first and second interface queues in a normal program mode.

DETAILED DESCRIPTION

Figure 1:
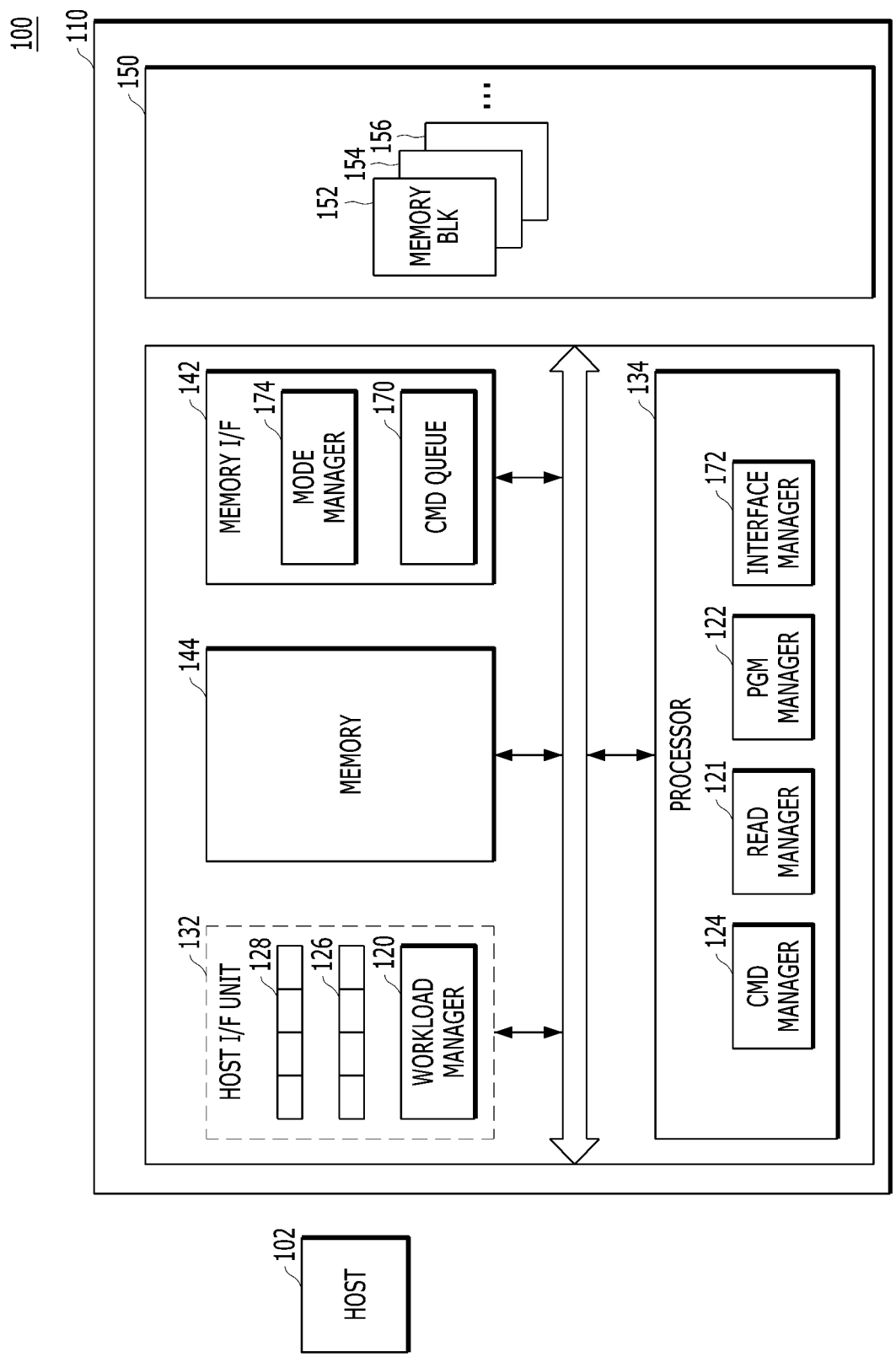
FIG. 1 is a block diagram illustrating an example of a data processing system including a memory system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to identify various elements, these elements should not be limited by these terms. These terms are only used to distinguish one element from another element that have the same or similar names. A first element in one instance may be termed a second element in another instance with indicating any change in the form or function of the element itself.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The disclosed embodiments are merely for the purpose of understanding the technical spirit of the present invention, not to limit it. As those skilled in the art to which the present disclosure pertains will recognize in light of the present disclosure various modifications within the scope of the invention may be made.

Unless otherwise defined, all terms including technical and scientific terms used herein have the same meaning as commonly understood by one of ordinary skill in the art to which the present disclosure belongs. Unless otherwise defined in the present disclosure, the terms should not be construed in an ideal or excessively formal way.

Hereinafter, various embodiments of the present invention are described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include one or more OS (operating system). The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and/or an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, a memory interface 142, and a memory 144, all operatively coupled or engaged via an internal bus. As described below with reference to FIG. 11, the processor 134 may include a command manager 124, an interface manager 172, a read manager 121, and a program manager 122. The host interface 132 may include a workload manager 120, a first interface queue 126, and a second interface queue 128. The memory interface 142 may include a command queue 170 and a mode manager 174.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134. Also, the controller 130 may perform a background operation on the memory device 150 through the processor 134. The background operation performed on the memory device 150 may include copying data stored in some memory blocks among the memory blocks of the memory device 150 and moving such data into other memory blocks, e.g., a garbage collection (GC) operation, swapping data between certain memory blocks, e.g., a wear-leveling (WL) operation, storing map data stored in the controller 130 in the memory blocks, e.g., a map flush operation, or managing bad blocks of the memory device 150, e.g., a bad block management operation of detecting and processing bad blocks among the memory blocks in the memory device 150.

Figure 2A:
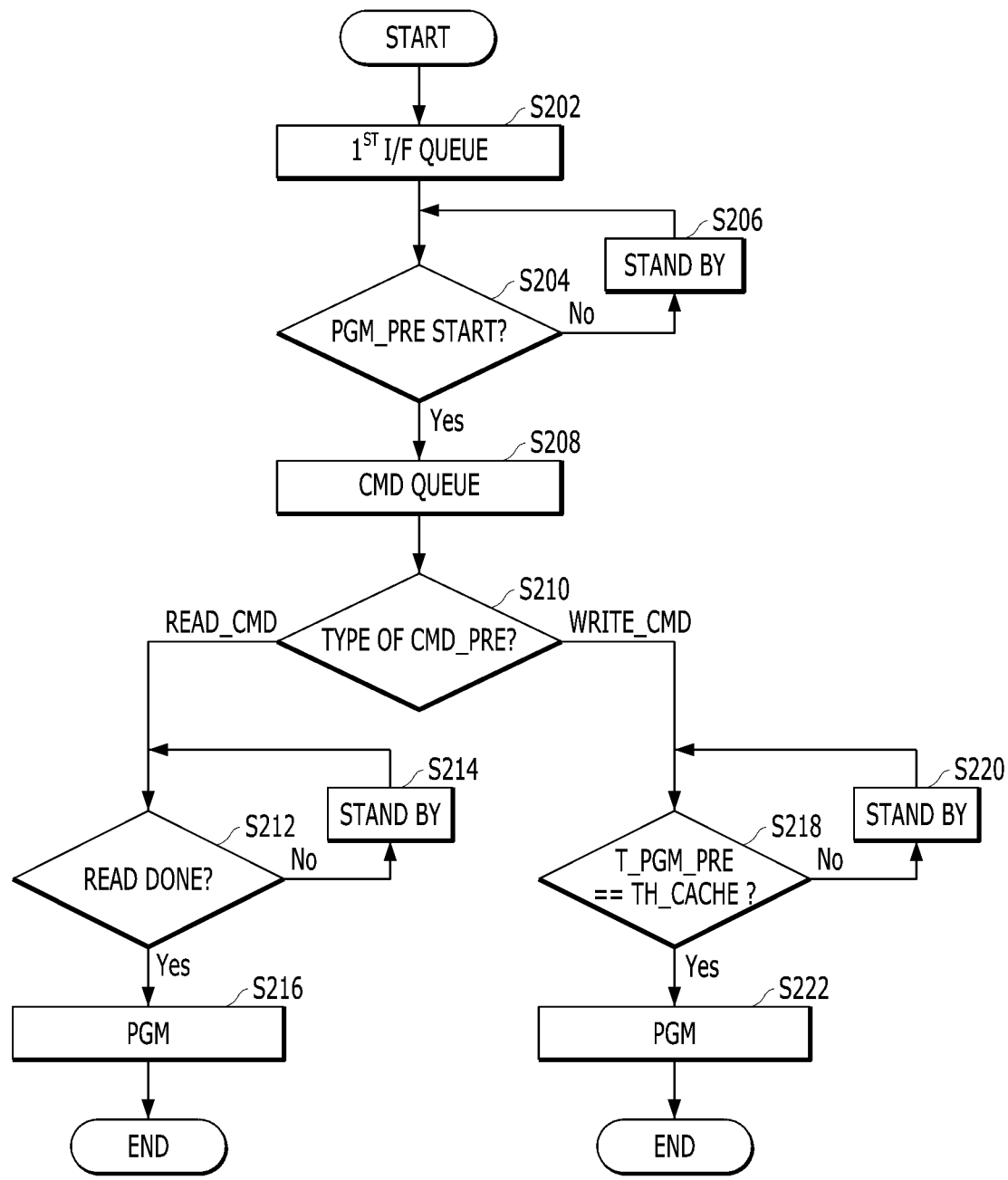
FIG. 2A is a flowchart describing processing of a write command in a cache program mode.

FIG. 2A is a flowchart describing processing of a write command in a cache program mode.

In step S202, the host interface 132 may receive a command from the host 102. When the command is a write command, the host interface 132 may enqueue the command to the first interface queue 126. When the command is a read command, the host interface 132 may enqueue the command to the second interface queue 128.

In step S204, the interface manager 172 may determine whether or not a program operation PGM_PRE for the previous write command has started. The previous write command may be the last write command received before the write command that is received in step S202.

In step S206, when the program operation PGM_PRE for the previous write command has not started yet ('N' in step S204), the interface manager 172 may not dequeue (i.e., stand by) the write command from the first interface queue 126.

In step S208, when the program operation PGM_PRE for the previous write command has started ('Y' in step S204), the interface manager 172 may dequeue the write command from the first interface queue 126 and enqueue it to the command queue 170.

In step S210, the command manager 124 may determine the type of the previous command CMD_PRE. The previous command CMD_PRE may be a command enqueued in the command queue 170 right before the write command, that is, enqueued in the command queue 170 in step S208.

In step S212, when the previous command CMD_PRE is a read command READ_CMD in step S210, the command manager 124 may determine whether or not the read operation according to the previous command CMD_PRE is completed.

In step S214, when the read operation is not completed ('N' in step S212), the command manager 124 may stand by without dequeuing the write command from the command queue 170.

In step S216, when the read operation is completed ('Y' in step S212), the command manager 124 may dequeue the write command from the command queue 170 and provide it to the memory device 150. The program manager 122 may control the memory device 150 to perform a program operation based on the write command.

When the previous command CMD_PRE is a write command WRITE_CMD in step S210, the command manager 124 may determine, in step S218, whether or not the time of programming the previous command CMD_PRE (T_PGM_PRE) has reached a threshold value TH_CACHE.

In step S220, when T_PGM_PRE has not reached TH_CACHE ('N' in step S218), the command manager 124 may stand by without dequeuing the write command from the command queue 170 until T_PGM_PRE reaches TH_CACHE.

In step S222, when T_PGM_PRE reaches TH_CACHE ('Y' in step S218), the command manager 124 may dequeue the write command from the command queue 170 and provide it to the memory device 150. The program manager 122 may buffer the program data for the write command in a page buffer while performing a program operation according to the previous command CMD_PRE. When the program operation according to the previous command CMD_PRE is completed, the program manager 122 may control the memory device 150 to program the buffered program data into memory blocks.

Figure 2B:
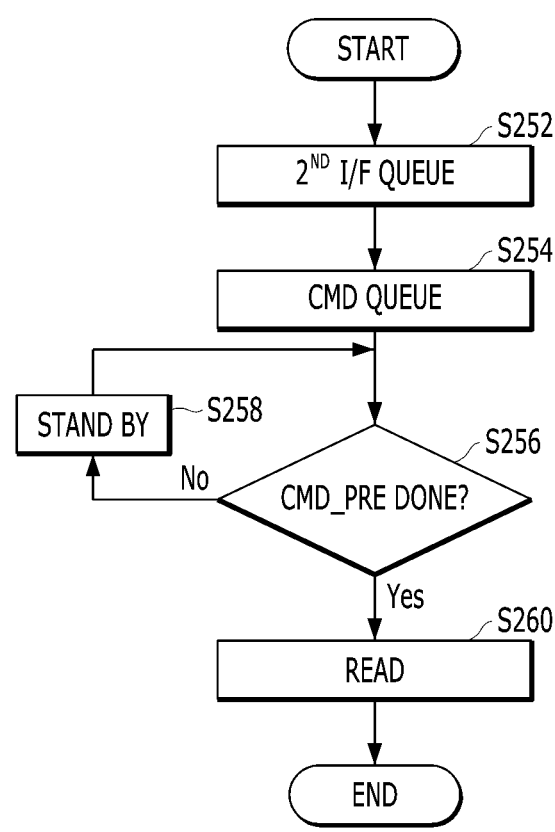
FIG. 2B is a flowchart describing processing of a read command in the cache program mode.

FIG. 2B is a flowchart describing processing of a read command in the cache program mode.

In step S252, the host interface 132 may receive a command from the host 102. When the command is a read command, the host interface 132 may enqueue the read command to the second interface queue 128.

In step S254, the interface manager 172 may dequeue the read command from the second interface queue 128 to enqueue in the command queue 170. Unlike processing of the write command described with reference to FIG. 2A, the read command enqueued in the second interface queue 128 may be promptly migrated to the command queue 170 without waiting.

In step S256, the command manager 124 may determine whether or not an operation according to the previous command CMD_PRE has been completed. The previous command CMD_PRE may be enqueued in the command queue 170 right before the write command that is enqueued in the command queue 170 in step S208.

In step S258, when the operation according to the previous command CMD_PRE is not completed ('N' in step S256), the command manager 124 may stand by without dequeuing the read command from the command queue 170.

In step S260, when the operation according to the previous command CMD_PRE is completed ('Y' in step S256), the command manager 124 may dequeue the read command from the command queue 170 and provide it to the memory device 150. The read manager 121 may control the memory device 150 to perform a read operation based on the read command.

As described above with reference to FIGS. 2A and 2B, in the cache program mode, when a program operation for the previous write command begins, the interface manager 172 may migrate a write command from the first interface queue 126 to the command queue 170. Conversely, in case of a read command, the interface manager 172 may migrate the read command from the second interface queue 128 to the command queue 170 as soon as the read command is enqueued in the second interface queue 128. The first interface queue 126, the second interface queue 128 and the command queue 170 may operate according to a first-in-first-out (FIFO) scheme.

Figure 3:
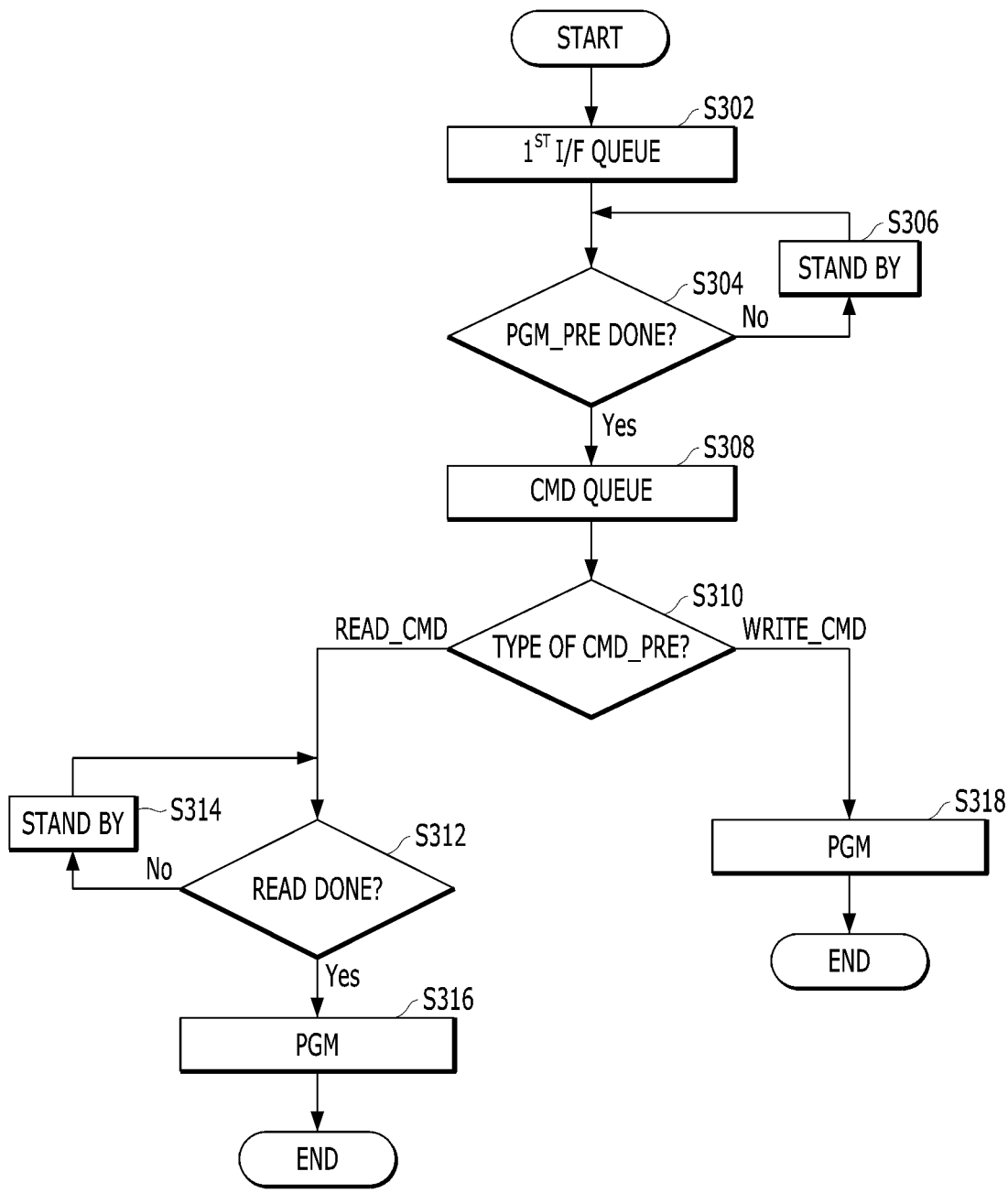
FIG. 3 is a flowchart describing processing of a write command in a normal program mode.

FIG. 3 is a flowchart describing processing of a write command in a normal program mode.

In step S302, the host interface 132 may receive a command from the host 102. The host interface 132 may enqueue the command to the first interface memory 126 or the second interface memory 128, depending on the type of command. When the command is a write command, the host interface 132 may enqueue the command to the first interface queue 126.

In step S304, the interface manager 172 may determine whether or not a program operation PGM_PRE for the previous write command is completed. The previous write command may have been received immediately before the write command received in step S302.

In step S306, when the program operation PGM_PRE for the previous write command is not completed yet ('N' in step S304), the interface manager 172 may stand by without dequeuing the write command from the first interface queue 126.

In step S308, when the program operation PGM_PRE for the previous write command is completed ('Y' in step S304), the interface manager 172 may dequeue the write command from the first interface queue 126 and enqueue it to the command queue 170.

In step S310, the command manager 124 may determine the type of the previous command CMD_PRE. The previous command CMD_PRE may have been enqueued in the command queue 170 right before the write command enqueued in the command queue 170 in the step S308.

In step S312, when the previous command CMD_PRE is a read command READ_CMD in step S310, the command manager 124 may determine whether or not the read operation according to the previous command CMD_PRE is completed.

In step S314, when the read operation is not completed ('N' in step S312), the command manager 124 may stand by without dequeuing the write command from the command queue 170.

In step S316, when the read operation is completed ('Y' in step S312), the command manager 124 may dequeue the write command from the command queue 170 and provide it to the memory device 150. The program manager 122 may control the memory device 150 to perform a program operation based on the write command.

In step S318, when the previous command CMD_PRE is a write command WRITE_CMD ('WRITE_CMD' in step S310), the command manager 124 may dequeue the write command from the command queue 170 and provide it to the memory device 150. The program manager 122 may control the memory device 150 to perform a program operation based on the write command.

The processing of the read command in the normal program mode is the same as the processing of the read command in the cache program mode, which is described above with reference to FIG. 2B.

As described above with reference to FIGS. 2A and 3, the processing of a write command in the cache program mode may be different from the processing of a write command in the normal program mode. For example, the conditions for migrating a write command from the first interface queue 126 to the command queue 170 may be different depending on the program mode. In the cache program mode, the write command may be migrated from the first interface queue 126 to the command queue 170 when the program operation PGM_PRE for the previous write command begins. In the normal program mode, the write command may be migrated from the first interface queue 126 to the command queue 170 when the program operation PGM_PRE for the previous write command is completed. Therefore, the write command may stay queued longer in the first interface queue 126 in the normal program mode than in the cache program mode. A read command may be migrated from the second interface queue 128 to the command queue 170 before a write command is migrated from the first interface queue 126 to the command queue 170 even when the read command is enqueued in the second interface queue 128 after the write command is enqueued in the first interface queue 126. Therefore, in the case of the normal program mode, compared with the cache program mode, the frequency that the later-received read command is enqueued to the command queue 170 ahead of the earlier-received write command that is received earlier may be higher.

As another example, at the time a write command is dequeued from the command queue 170 and provided to the memory device 150 may be different in the cache program mode than in the normal program mode. In the cache program mode, even when the program operation for the previous write command is not completed, i.e., is still being performed, the write command may be dequeued from the command queue 170 and provided to the memory device 150. On the other hand, in the normal program mode, since a write command may be enqueued to the command queue 170 only when the program operation for the previous write command is completed, the write command may be dequeued from the command queue 170 and provided to the memory device 150 after the program operation for the previous write command is completed. Therefore, program operations for write commands that are sequentially enqueued to the command queue 170 may be performed faster in the cache program mode than in the normal program mode.

As described above, the conditions for migrating a write command from the first interface queue 126 to the command queue 170 and the conditions for dequeuing a write command from the command queue 170 to the memory device 150 may be different in the cache program mode than in the normal program mode. Thus, the read latencies may be different in the cache program mode as compared to the normal program mode. The read latency may be the time from when the host 102 provides the memory system 110 with a read command to when the host 102 receives read data associated with the read command. The read latency may include not only the read time but also the time from when the read command is enqueued to the command queue 170 to when a read operation is performed. Since the read latency in the cache program mode is greater than the read latency in the normal program mode on average, there may be a problem in that the requested data are not received within the time expected by a user.

Figure 4A:
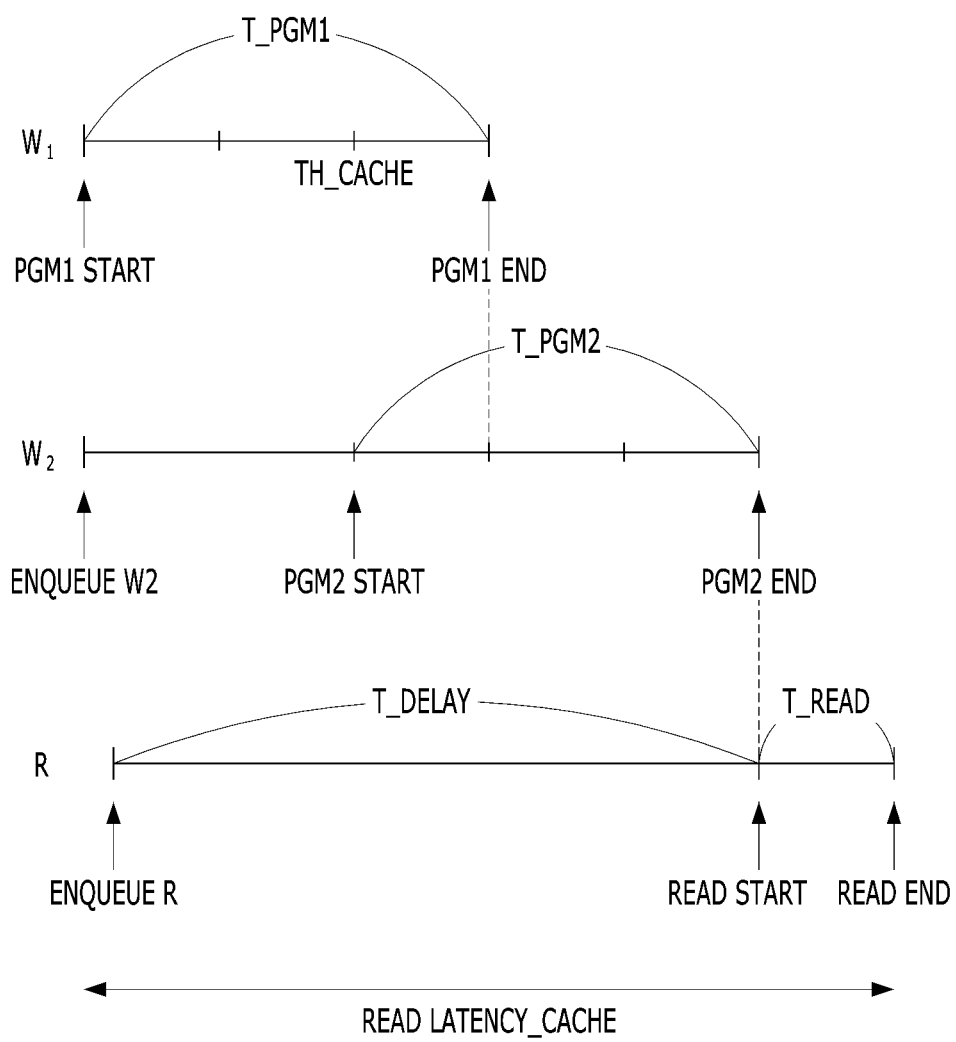
FIGS. 4A and 4B are diagrams illustrating read latency according to a program mode.
Figure 4B:
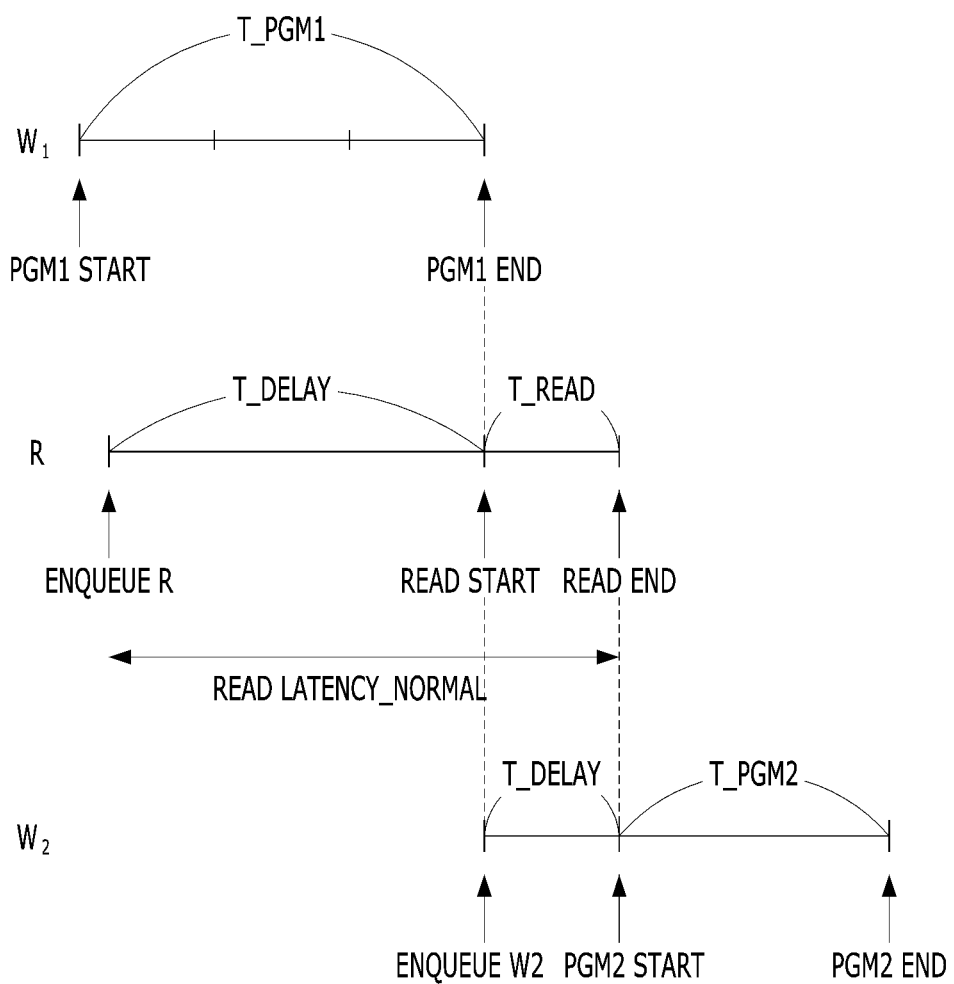

FIGS. 4A and 4B are diagrams illustrating read latency according to a program mode.

FIG. 4A is a timing diagram illustrating read latency in the cache program mode.

By way of example, a case in which a first write command W1 and a second write command W2 are enqueued in the first interface queue 126 and, during that time, the read command R is received after a first program operation for the first write command W1 begins is described below.

Referring to FIG. 4A, when the first program operation for the first write command W1 begins, the interface manager 172 may migrate the second write command W2 to the command queue 170. When a first program operation time T_PGM1, for a program operation performed in response to the first write command W1 reaches the threshold value TH_CACHE, the program manager 122 may control the memory device 150 to perform a second program operation for the second write command queue W2 by dequeuing the second write command W2 and providing it to the memory device 150. The read command R received after the second write command W2 may be enqueued in the command queue 170 after the second write command W2 is migrated from the first interface queue 126 to the command queue 170. As a result, there may be a delay, i.e., a delay time T_DELAY, until the second program operation, which is the previous command operation, is completed may occur. The delay time T_DELAY may be as much as the difference between a sum of a maximum first program operation execution time T_PGM1 and a second program operation execution time T_PGM2 and a time taken from when PGM2 START, i.e., the second program operation, begins to when PGM1 END, i.e., the first program operation is completed. The latency READ LATNECY_CACHE of the read command R may be defined as the sum of the delay time T_DELAY and the read operation time T_READ.

FIG. 4B is a timing diagram illustrating read latency in the normal program mode.

By way of example, as in FIG. 4A, a case in which the read command R is received after the first program operation for the first write command W1 begins while the first and second write commands W1 and W2 are enqueued in the first interface queue 126 is described below.

While the first program operation is being performed in response to the first write command W1, the second write command W2 should stay queued in the first interface queue 126 but the read command R may be migrated from the second interface queue 128 to the command queue 170, which causes the read command R to be enqueued in the command queue 170 prior to the second write command W2. Since the first write command W1, the read command R, and the second write command W2 are sequentially enqueued in the command memory 170, the read operation may be delayed until the first program operation is completed in response to the first write command W1. The delay time that occurs may be as much as the execution time of the first program operation T_PGM1.

The cache program mode allows fast program operation, which may improve the program performance in workloads where write commands are continuously provided. However, as described above with reference to FIGS. 4A and 4B, when write and read commands are provided, the read latency may be greater in the cache program mode than in the normal program mode. According to an embodiment of the present invention, the controller 130 may improve the read performance by detecting that multiple types of commands (mixed workload) are being provided in the cache program mode and switching the cache program mode to the normal program mode when the number of read commands enqueued in the second interface queue 128 in the cache program mode exceeds a first threshold value. In addition, the controller 130 may improve the program performance by detecting when only write commands are provided in the normal program mode and switching the normal program mode to the cache program mode when the number of write commands enqueued in the first interface queue 126 in the normal program mode exceeds a second threshold value.

Figure 5A:
FIG. 5A is a block diagram illustrating a mixed workload.
Figure 5B:
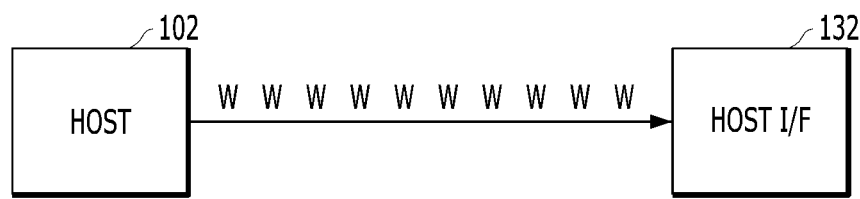
FIG. 5B is a block diagram illustrating a sequential workload.

FIG. 5A is a block diagram illustrating a mixed workload.
FIG. 5B is a block diagram illustrating a sequential workload.

Referring to FIG. 5A, a combination of write and read commands provided from the host 102 in the cache program mode may be considered a mixed workload. The mixed workload may refer to a sequence of commands provided from the host 102 in which all of the commands in the sequence are not of the same type; that is, a mix of read and write commands are provided. According to an embodiment of the present invention, it may be determined that a mixed workload is being provided to the memory system 110 when a number of read commands enqueued in the second interface queue 128 in the cache program mode exceeds a first threshold value TH1. According to an embodiment of the present invention, the workload manager 120 may increase a read count whenever a read command is enqueued in the second interface queue 128. When the read count is greater than the first threshold value TH1 in the cache program mode, the workload manager 120 may determine currently provided commands as a mixed workload.

Referring to FIG. 5B, all write commands sequentially provided from the host 102 to the host interface 132 in the normal program mode may be regarded as a sequential workload. In general, a sequential workload may refer to a group of a single type of command, e.g., a write command, being provided. According to an embodiment of the present invention, it may be determined that a sequential workload is being provided to the memory system 110 when a number of write commands enqueued in the first interface queue 126 in the normal program mode exceeds a second threshold value TH2. According to an embodiment of the present invention, the workload manager 120 may reset a write count upon receiving of a read command, and increase the write count whenever a write command is enqueued in the first interface queue 126. When the write count is greater than the second threshold value TH2 in the normal program mode, the workload manager 120 may determine currently provided commands as a sequential workload.

Figure 6:
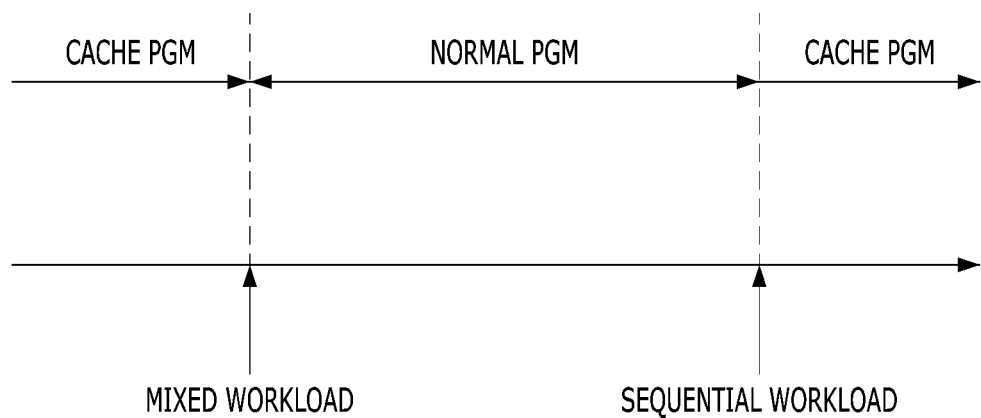
FIG. 6 illustrates a process of changing a program mode based on workload in accordance with an embodiment of the present invention.

FIG. 6 illustrates a process of changing the program mode based on the workload in accordance with an embodiment of the present invention.

The program manager 122 may control the memory device 150 to perform a program operation in the cache program mode. According to an embodiment of the present invention, an initial program mode may be a cache program mode.

In the cache program mode, the workload manager 120 may detect a mixed workload. According to an embodiment of the present invention, the workload manager 120 may increase the read count whenever a read command is enqueued in the second interface queue 128, and when the read count becomes greater than the first threshold value TH1 in the cache program mode, the workload manager 120 may determine currently provided commands as a mixed workload. The mode manager 174 may switch the program mode from the cache program mode to the normal program mode based on the determination of the workload manager 120. When the currently provided commands are determined as a mixed workload, the program manager 122 may process the commands queued in the command queue 170 in the cache program mode while processing the write commands queued in the first interface queue 126 in the normal program mode.

In the normal program mode, the workload manager 120 may detect the sequential workloads. According to an embodiment of the present invention, the workload manager 120 may increase the write count whenever a write command is enqueued in the first interface queue 126, and reset the write count when a read count is provided. When the write count becomes greater than the second threshold value TH2 in the normal program mode, the workload manager 120 may determine that currently provided commands are a sequential workload. The mode manager 174 may switch the program mode from the normal program mode to the cache program mode based on the determination of the workload manager 120. When the currently provided commands are determined as a sequential workload, the program manager 122 may process the commands queued in the command queue 170 and the first and second interface queues 126 and 128 in the cache program mode.

Figure 7:
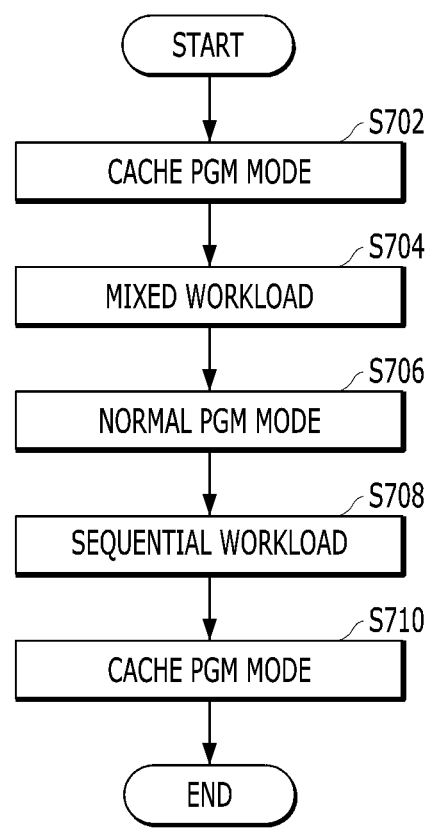
FIG. 7 is a flowchart describing an operating process of a memory system in accordance with an embodiment of the present invention.

FIG. 7 is a flowchart describing an operating process of the memory system 110 in accordance with an embodiment of the present invention.

In step S702, the program manager 122 may control the memory device 150 to perform a program operation in the cache program mode. As described above with reference to FIG. 2A, in the cache program mode, the interface manager 172 may migrate a write command from the first interface queue 126 to the command queue 170 when a program operation for a previous write command begins. The command manager 124 may dequeue the write command from the command queue 170 and provide it to the memory device 150 during the program operation for the previous write command when the execution time thereof reaches a threshold value. The program manager 122 may control the memory device 150 to perform a program operation based on the write command.

In step S704, the workload manager 120 may detect currently provided commands as a mixed workload. The workload manager 120 may increase the read count whenever a read command is received, and detect the currently provided commands as a mixed workload when the read count becomes greater than the first threshold value TH1.

Figure 8:
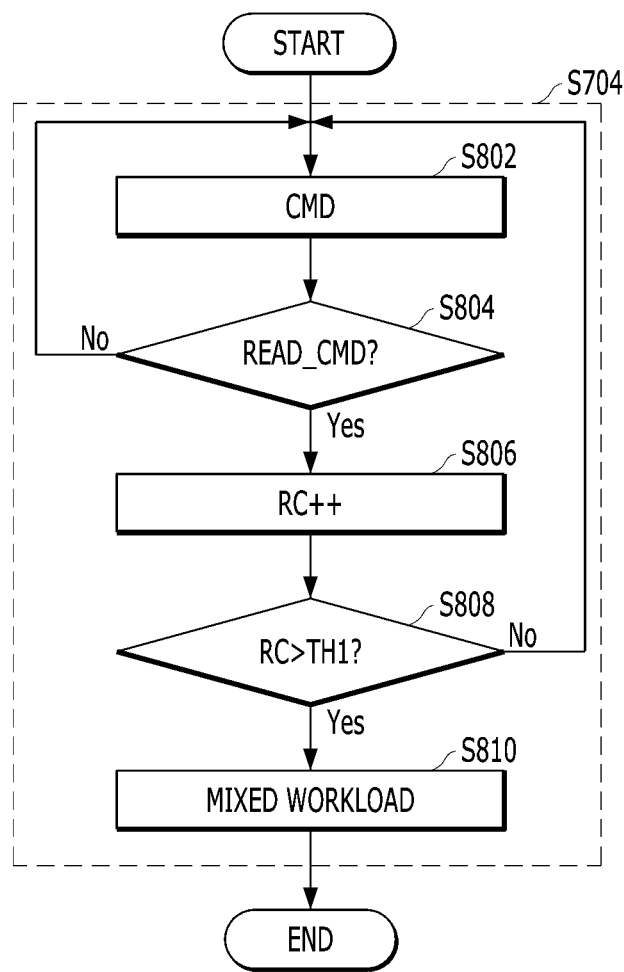
FIG. 8 is a flowchart describing a process of detecting a mixed workload.

FIG. 8 is a detailed flowchart describing a process of detecting the currently provided commands as a mixed workload.

In step S802, the host interface 132 may receive a command provided from the host 102.

In step S804, the workload manager 120 may determine the type of the command which is received in the step S802. The workload manager 120 may determine whether or not the command is a read command. When the command is not a read command ('N' in step S804), the process may return to step S802 and the host interface 132 may receive another command from the host 102.

In step S806, when the command received in the step S802 is a read command ('Y' in step S804), the workload manager 120 may increase the read count. The workload manager 120 may store the read count in the memory 144.

In step S808, the workload manager 120 may compare the read count, as increased in step S806, with the first threshold value TH1. When the read count is equal to or less than the first threshold TH1 ('N' in step S808), the process may return to step S802 and the host interface 132 may receive another command provided from the host 102.

In step S810, when the read count becomes greater than the first threshold value TH1 ('Y' in step S808), the workload manager 120 may detect the currently provided commands as the mixed workload MIXED WORKLOAD.

Referring back to FIG. 7, in step S706, the mode manager 174 may switch the program mode from the cache program mode to the normal program mode based on the detection of a mixed workload. The program manager 122 may process the commands queued in the first interface queue 126 in the normal program mode. However, the program manager 122 may process the commands queued in the command queue 170 at starting at the time at which the currently provided commands are detected as a mixed workload in the cache program mode.

Figure 9A:
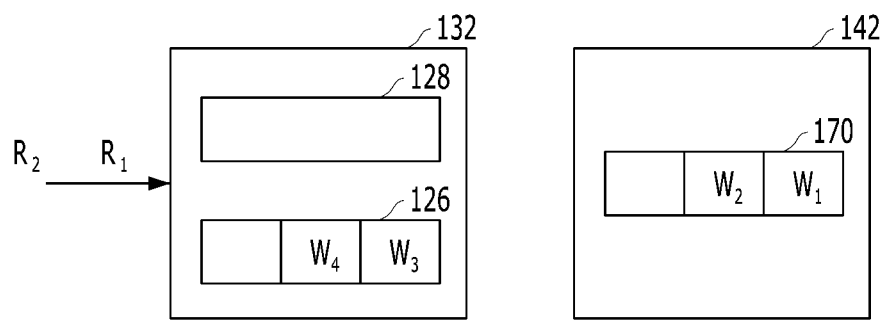
FIGS. 9A and 9B illustrate processing of commands queued in a first interface queue and a command queue when a mixed workload is detected.
Figure 9B:
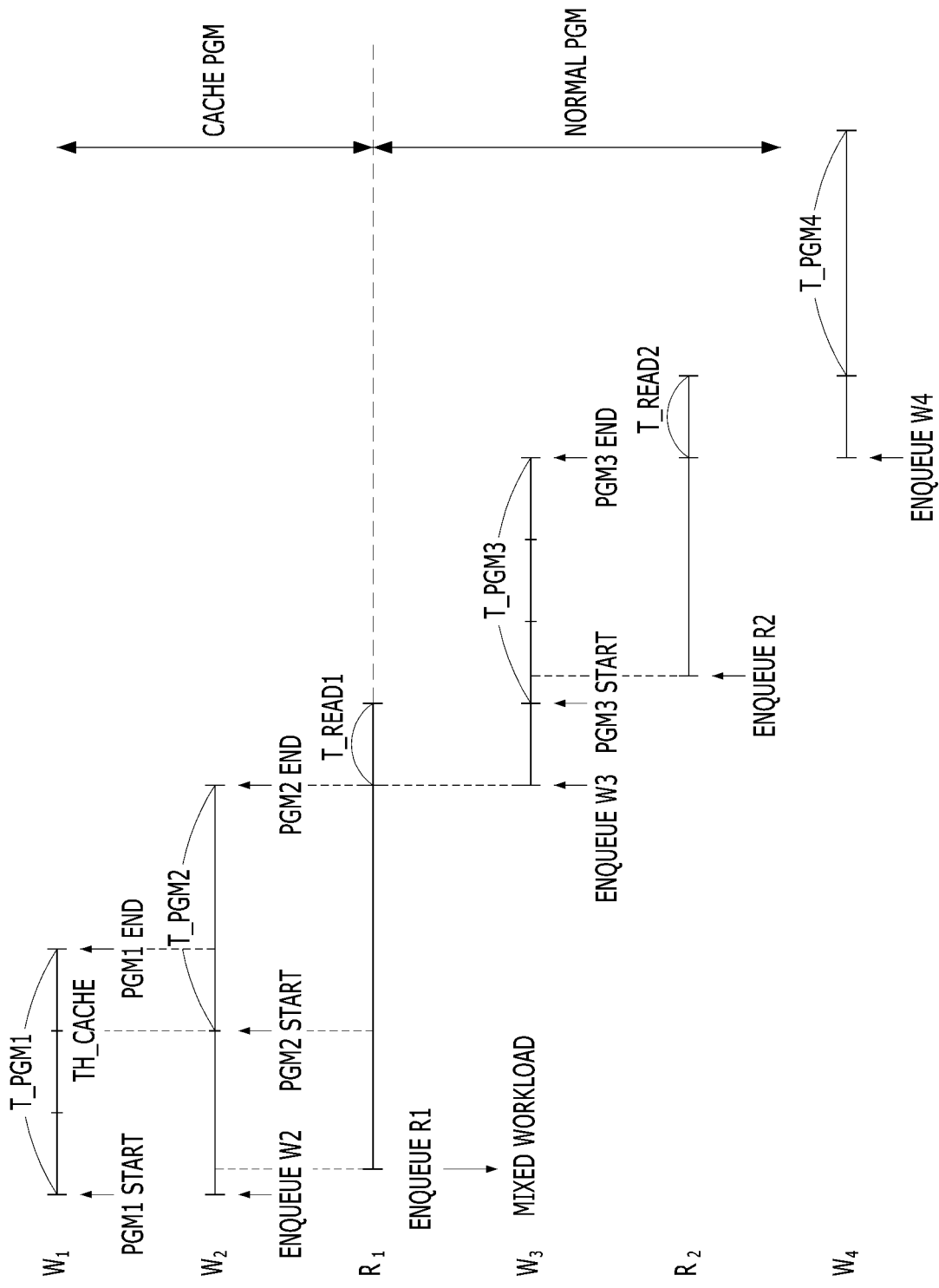

FIGS. 9A and 9B illustrate a process of processing commands queued in the first interface queue 126 and the command queue 170 at a moment when the currently provided commands are detected as the mixed workloads.

FIG. 9A illustrates the first interface queue 126 and the command queue 170 that queue write commands.

By way of example, a case in which a first read command R1 and a second read command R2 are received while the command queue 170 queues a first write command W1 and a second write command W2 and the first interface queue 126 queues a third write command W3 and a fourth write command W4 is described. Also, a case in which the currently provided commands are detected as a mixed workload at the time at which the first read command R1 is received is described.

Referring to FIGS. 9A and 9B, the program manager 122 may control the memory device 150 to perform a first program operation in response to the first write command W1. When the first program operation begins, the interface manager 172 may enqueue the second write command W2 in the command queue 170. Subsequently, when the first read command R1 is received from the host 102, the first read command R1 may be enqueued in the second interface queue 128 and the workload manager 120 may increase the read count. When the read count becomes greater than the first threshold value TH1, the currently provided commands may be detected as a mixed workload. The interface manager 172 may migrate the first read command R1 from the second interface queue 128 to the command queue 170.

The processor 134 may process the first and second write commands W1 and W2 that are queued in the command queue 170 in the cache program mode at the time at which the currently provided commands are detected as a mixed workload. The command manager 124 and the program manager 122 may control the memory device 150 to perform a second program operation in response to the second write command W2 when the first program operation execution time T_PGM1 reaches a threshold value TH_CACHE. When the second program operation is completed, the read manager 121 may control the memory device 150 to perform a first read operation in response to the first read command R1 by dequeuing the first read command R1 and providing it to the memory device 150. According to an embodiment of the present invention, the command manager 124 and the program manager 122 may reduce the read latency for the read command that is received when the currently provided commands are detected as a mixed workload by processing the write commands queued in the command queue 170 in the cache program mode.

The processor 134 may process the third and fourth write commands W3 and W4 that are queued in the first interface queue 126 in the normal program mode at the time at which the currently provided commands are detected as a mixed workload. The interface manager 172 may migrate the third write command W3 from the first interface queue 126 to the command queue 170 at the time at which the second program operation for the previous write command W2 is completed. When the first read operation for the previous command (i.e., the first read command R1) is completed, the command manager 124 may dequeue the third write command W3 from the command queue 170 and provide it to the memory device 150, and the program manager 122 may control the memory device 150 to perform a third program operation for the third read command W3.

When the second read command R2 is received from the host 102 right after the third program operation begins, the interface manager 172 may migrate the second read command R2 from the second interface queue 128 to the command queue 170 before the fourth write command W4, which is received ahead of the second read command R2, is migrated from the first interface queue 126 to the command queue 170. When the third program operation is completed, the read manager 121 may control the memory device 150 to perform a second read operation for the second read command R2 by dequeuing the second read command R2 from the command queue 170 and providing it to the memory device 150. Since the fourth write command W4 is enqueued in the command queue 170 at that the time at which the third program operation for the third write command W3 is completed, the read manager 121 may perform the second read operation before performing the fourth program operation for the fourth write command W4, thus reducing the read latency.

Although not illustrated, the processor 134 may process in the normal program mode the write commands that are received from the host 102 immediately after the workload is detected to be a mixed workload.

Returning back to FIG. 7, in step S708, the workload manager 120 may detect the currently provided commands as a sequential workload in the normal program mode. According to an embodiment of the present invention, the workload manager 120 may increase the write count whenever a write command is received, and may reset the write count when a read command is received. When the write count becomes greater than the second threshold value TH2 in the normal program mode, the workload manager 120 may detect the current provided commands as a sequential workload. Whenever the workload manager 120 receives a read command, the workload manager 120 may reset the write count and detect that only write commands are being provided by comparing the write count with the second threshold value TH2.

Figure 10:
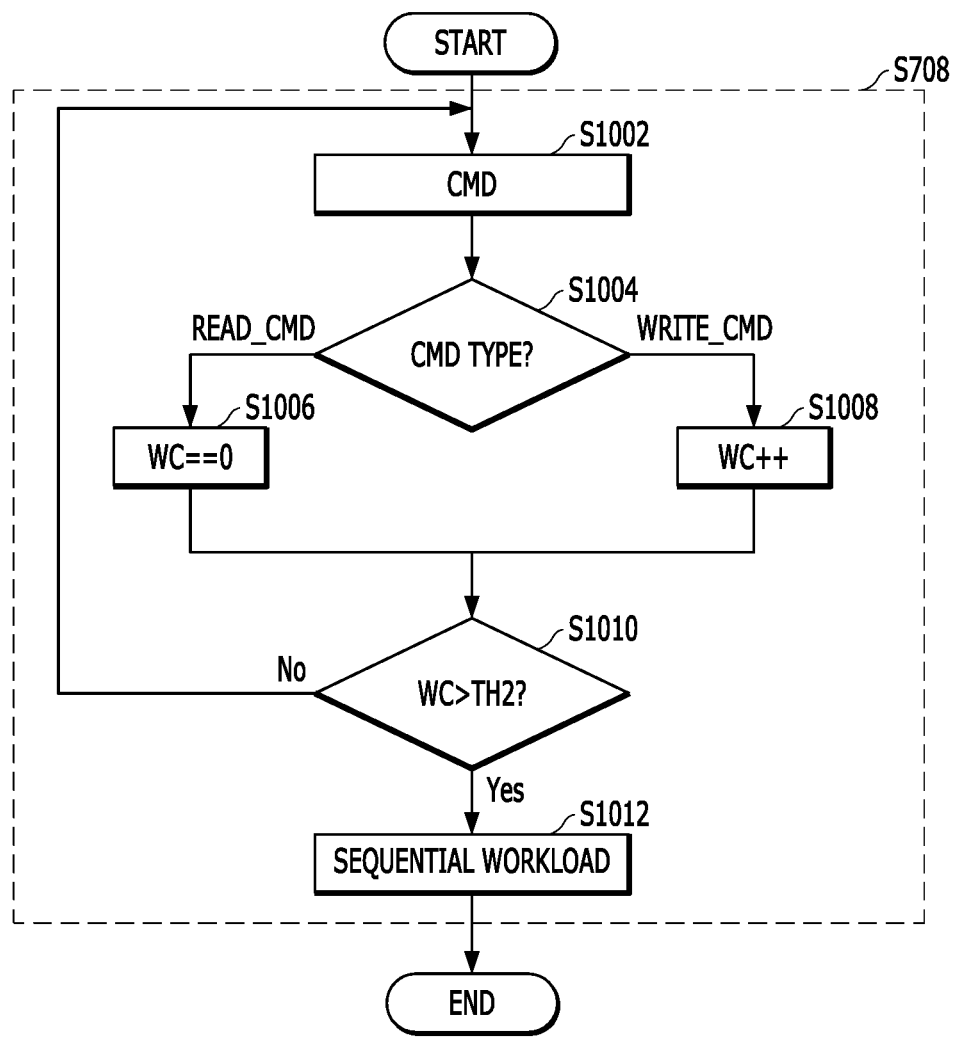
FIG. 10 is a flowchart describing a process of detecting a sequential workload.

FIG. 10 is a flowchart describing a process of detecting currently provided commands as a sequential workload.

In step S1002, the host interface 132 may receive a command provided from the host 102.

In step S1004, the workload manager 120 may determine the type of the command received in step S1002. The workload manager 120 may determine whether or not the command is a read command.

When the command received in step S1002 is determined to be a read command READ_CMD' in step S1004), the workload manager 120 may reset the write count WC in step 1006. For example, the workload manager 120 may set the write count WC to an initial value, e.g., '0'. The workload manager 120 may store the write count WC in the memory 144.

When the command received in step S1002 is determined to be a write command WRITE_CMD in step S1004, the workload manager 120 may increase the write count WC in step S1008. The workload manager 120 may store the write count WC in the memory 144.

In step S1010, the workload manager 120 may compare the write count WC, as increased in step S1008, with the second threshold value TH2. When the write count WC is equal to or less than the second threshold value TH2 ('N' in step S1010), the process may return to step S1002, and the host interface 132 may receive another command from the host 102.

In step S1012, when the write count WC, as increased in step S1008, is greater than the second threshold value TH2 ('Y' in step S1010), the workload manager 120 may detect the currently provided commands as a sequential workload. According to an embodiment of the present invention, the workload manager 120 may reset the write count WC whenever a read command is provided, and when the write count WC becomes greater than the second threshold value, the workload manager 120 may detect a workload in which only write commands are provided as a sequential workload.

Referring back to FIG. 7, in step S710, the processor 134 may process write commands queued in the first interface queue 126 and the command queue 170 in the cache program mode from the time at which the currently provided commands are detected as a sequential workload. According to an embodiment of the present invention, the processor 134 may further improve the program performance by switching from the normal program mode to the cache program mode at the time at which the currently provided commands are detected as a sequential workload.

Figure 11:
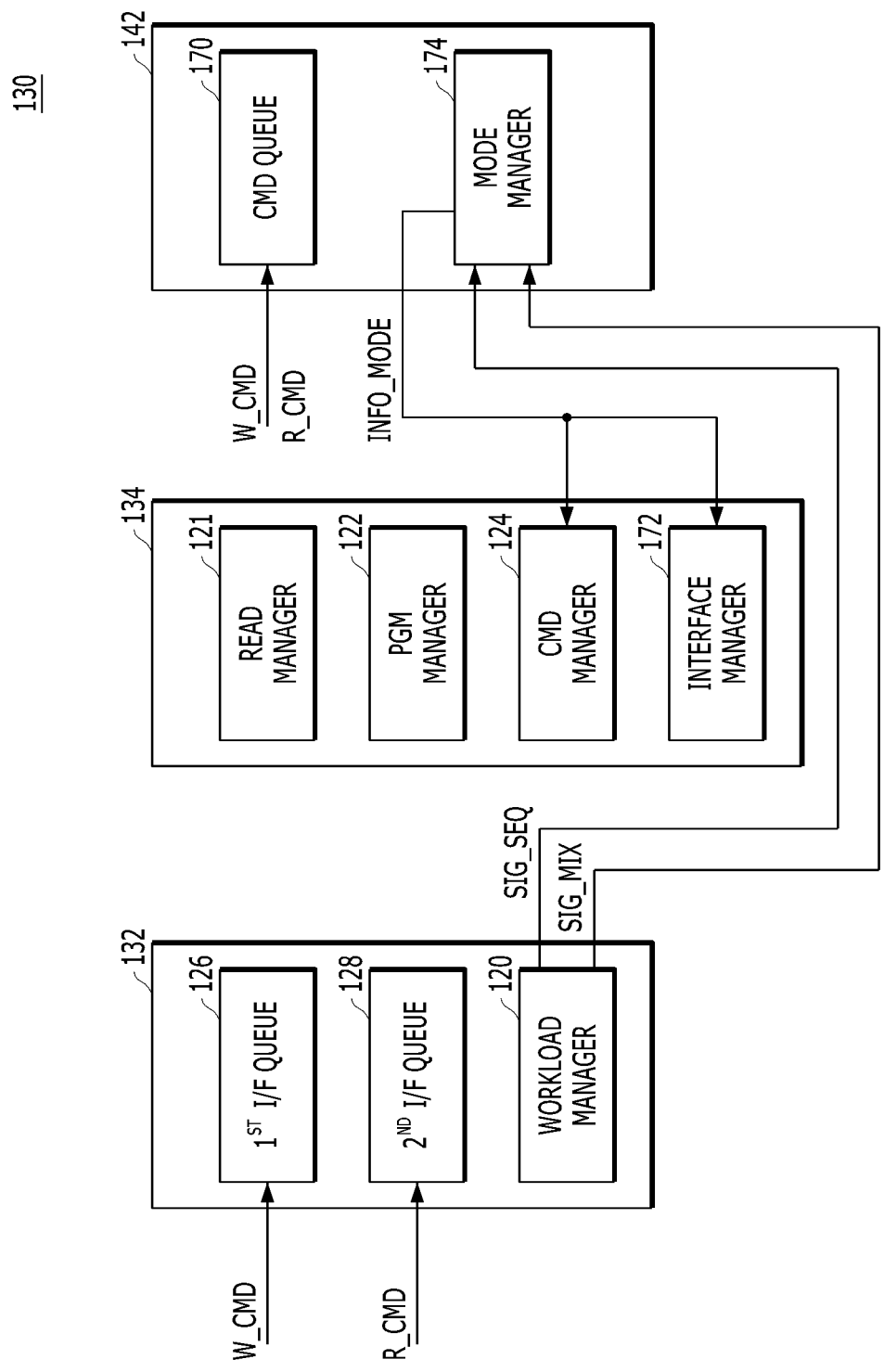
FIG. 11 is a block diagram illustrating a controller in accordance with an embodiment of the present invention.

FIG. 11 is a block diagram illustrating the controller 130 in accordance with an embodiment of the present invention. FIG. 11 illustrates only select structure related to the present invention in the data processing system 100 of FIG. 1.

The controller 130 may include the host interface 132, the processor 134, and the memory interface 142. The host interface 132 may include the workload manager 120, the first interface queue 126, and the second interface queue 128. The processor 134 may include the read manager 121, the program manager 122, the command manager 124, and the interface manager 172. The memory interface 142 may include the command queue 170 and the mode manager 174.

The host interface 132 may receive a command provided from the host 102. The host interface 132 may store a write command W_CMD and a read command R_CMD in the first interface queue 126 and the second interface queue 128, respectively.

The workload manager 120 may detect the currently provided commands as a mixed workload in the cache program mode and as a sequential workload in the normal program mode. The workload manager 120 may detect the currently provided commands as a mixed workload based on the number of read commands R_CMD enqueued in the second interface queue 128 and as a sequential workload based on the number of write commands W_CMD enqueued in the first interface queue 126. According to an embodiment of the present invention, the workload manager 120 may increase the read count whenever a read command R_CMD is received in the cache program mode. When the read count is greater than the first threshold value TH1, the workload manager 120 may detect the currently provided commands as a mixed workload in the cache program mode. When the workload manager 120 detects the currently provided commands as a mixed workload, the workload manager 120 may provide the mode manager 174 with a mixed workload signal SIG_MIX for the mixed workloads.

Also, the workload manager 120 may increase the write count whenever a write command W_CMD is received in the normal program mode, and when the read command R_CMD is received, it may reset the write count. When the write count is greater than the second threshold TH2, the workload manager 120 may detect the currently provided commands as a sequential workload in the normal program mode. When the workload manager 120 detects the currently provided commands as a sequential workload, the workload manager 120 may provide the mode manager 174 with a sequential workload signal SIG_SEQ for the sequential workloads.

The mode manager 174 may determine a program mode based on the mixed workload signal SIG_MIX and the sequential workload signal SIG_SEQ. The mode manager 174 may provide the command manager 124 and the interface manager 172 with information about the program mode INFO_MODE in response to the mixed workload signal SIG_MIX and the sequential workload signal SIG_SEQ.

The interface manager 172 may migrate the write command W_CMD and the read command R_CMD from the first interface queue 126 and the second interface queue 128 to the command queue 170, respectively, based on the information about the program mode INFO_MODE. The command manager 124 may migrate the read command R_CMD from the second interface queue 128 to the command queue 170 right after the read command R_CMD is stored in the second interface queue 128 in both of the cache program mode and the normal program mode.

When a program operation of the previous write command, which is right ahead of the write command stored in the first interface memory 126, begins, the interface manager 172 may migrate the stored write command from the first interface queue 126 to the command queue 170 in the cache program mode based on the information about the program mode INFO_MODE. Also, when the program operation of the previous write command, which is right ahead of the write command stored in the first interface memory 126, is completed, the interface manager 172 may migrate the stored write command from the first interface queue 126 to the command queue 170 in the normal program mode. According to an embodiment of the present invention, the command manager 124 may process the write commands queued in the first interface queue 126 in the normal program mode starting at the time at which the currently provided commands are detected as a mixed workload.

The command manager 124 may dequeue the read command R_CMD and the write command W_CMD from the command queue 170 and provide them to the memory device 150 according to a FIFO scheme. When an operation in response to a previous command is completed, the command manager 124 may dequeue the next command from the command queue 170 and provide it to the memory device 150. In the cache program mode, when the program operation execution time for the previous write command reaches a threshold value TH_CACHE, the command manager 124 may dequeue the write command from the command queue 170 during that program operation and provide it to the memory device 150. According to an embodiment of the present invention, the command manager 124 may process the commands queued in the command queue 170 in the cache program mode at that time at which the currently provided commands are detected as a mixed workload.

The program manager 122 may control the memory device 150 to perform a program operation in response to a write command dequeued from the command queue 170 and provided to the memory device 150.

The read manager 121 may control the memory device 150 to perform a read operation in response to the read command dequeued from the command queue 170 and provided to the memory device 150. The read manager 121 may provide the host 102 with data that are read from the memory device 150.

According to embodiments of the present invention, when the memory system detects mixed workloads while operating in a cache program mode, the memory system may reduce read latency by operating in a normal program mode. Also, when sequential workloads are detected while operating in the normal program mode, the memory system may improve program performance by operating in the cache program mode.

While the present invention has been illustrated and described with respect to specific embodiments, it will be apparent to those skilled in the art in light of the present disclosure that various changes and modifications may be made without departing from the spirit and scope of the invention as defined in the following claims.

What is claimed is:

1. A memory system, comprising:
a memory device;
a host interface including an interface queue, wherein the host interface is configured to receive write commands and queue the write commands in the interface queue;
a processor configured to process write commands queued in a command queue in a cache program mode and process the write commands queued in the interface queue in a normal program mode, wherein the processor includes:
a workload circuit configured to detect, while the memory system is in the cache program mode, a mixed workload by determining that a read count is greater than a first threshold value, the read count representing a number of read commands queued in the interface queue and the mixed workload representing receipt of a mix of the read commands and the write commands queued in the command queue; and
a mode circuit configured to switch from the cache program mode to the normal program mode in response to the mixed workload being detected, wherein the workload circuit resets, when the workload circuit receives a read command, a write count representing a number of the write commands queued in the interface queue, and wherein, when the write count is greater than a second threshold value in the normal program mode, the workload circuit detects a sequential workload indicating that a select group of received commands are all write commands.

2. The memory system of claim 1, wherein the processor further includes an interface circuit configured to migrate the write commands from the interface queue to the command queue based on whether the memory system is in the normal program mode or the cache program mode.

3. The memory system of claim 2, wherein, when a program operation begins in response to processing a first write command while the memory system is in the cache program mode, the interface circuit migrates a second write command, which is enqueued in the interface queue after the first write command, from the interface queue to the command queue.

4. The memory system of claim 2, wherein, when a program operation of a first write command is completed while the memory system is in the normal program mode, the interface circuit migrates a second write command, which is enqueued in the interface queue after the first write command, from the interface queue to the command queue.

5. The memory system of claim 1, wherein the mode circuit determines whether to switch from the normal program mode to the cache program mode based on whether the sequential workload is detected while the memory system is in the normal program mode.

6. The memory system of claim 5, wherein the processor processes, in the cache program mode when the sequential workload is detected, the write commands queued in the command queue and the interface queue.

7. The memory system of claim 1, wherein the processor further includes a command circuit configured to provide the memory device with the write commands queued in the command queue.

8. The memory system of claim 7, wherein, when an execution time of a program operation of a first write command dequeued from the command queue reaches a third threshold value, the command circuit is further configured to: enqueue a second write command in a memory queue after a first write command is enqueued in the memory queue, and when an execution time of a program operation of the first write command reaches a third threshold value, provide the memory device with a second write command.

9. The memory system of claim 7, wherein, when a program operation performed in response to a first write command in the command queue while the memory system is in the normal program mode is completed, the command circuit is further configured to: enqueue a second write command in a memory queue after the first write command is enqueued in the memory queue, and when an execution time of a program operation of the first write command reaches a third threshold value, provide the memory device with the second write command.

10. The memory system of claim 1, wherein the processor includes one of a microprocessor and a central processing unit (CPU).

11. A method for operating a memory system, comprising:

receiving write commands and enqueuing the write commands in an interface queue included in a host interface;

determining whether a read count is greater than a first threshold value in a cache program mode, wherein the read count represents a number of read commands queued in the interface queue;

detecting a mixed workload in response to the determining the read count is greater than the first threshold, wherein the mixed workload represents receipt of a mix of the read commands and the write commands while the memory system is in a cache program mode;

switching from the cache program mode to a normal program mode in response to the mixed workload being detected;

processing write commands queued in a command queue in the cache program mode and processing the write commands queued in the interface queue in the normal program mode;

receiving a read command;

resetting a write count, wherein the write count represents a number of the write commands enqueued in the interface queue;

determining whether the write count is greater than a second threshold value; and detecting a sequential workload in response to the determining the write count is greater than the second threshold value while the memory system is in the normal program mode, wherein the sequential workload indicates that a select group of the received commands are all write commands.

12. The method of claim 11, wherein the processing includes migrating the write commands from the interface queue to the command queue based on whether the memory system is in the normal program mode or the cache program mode.

13. The method of claim 12, further comprising:

enqueing in the interface queue a second write command after enqueing into the interface queue a first write command;

beginning a program operation for the first write command while the memory system is in the cache program mode; and migrating the second write command from the interface queue to the command queue in response to the beginning the program operation for the first write command while the memory system is in the cache program mode.

14. The method of claim 12, further comprising:

enqueing in the interface queue a second write command after enqueing into the interface queue a first write command;

beginning a program operation for the first write command while the memory system is in the normal program mode; and migrating the second write command from the interface queue to the command queue in response to the beginning the program operation for the first write command while the memory system is in the normal program mode.

15. The method of claim 11, further comprising: switching from the normal program mode to the cache program mode in response to the sequential workload being detected.

16. The method of claim 15, further comprising: processing the write commands queued in the command queue and the interface queue according to the cache program mode of the memory system in response to the sequential workload being detected.

17. The method of claim 11, wherein the processing includes providing a memory device with the write commands queued in the command queue.

18. The method of claim 17, further comprising:
    enqueing a second write command in the interface queue after a first write command is enqueued in the interface queue;
    dequeing the first write command from the interface queue and beginning a program operation of the first write command; and
    providing the memory device with the second write command after the execution time of the program operation of the first write command reaches a third threshold value.

19. The method of claim 17, further comprising:
    enqueing a second write command in the interface queue after the first write command is enqueued in the interface queue;
    dequeing the first write command from the interface queue and beginning a program operation of the first write command; and
    providing the memory device with the second write command after the execution time of the program operation of the first write command is completed.

20. The method of claim 11, wherein the processor includes one of a microprocessor and a central processing unit (CPU).

* * * * *